Aug. 16, 1938.      L. E. REID      2,126,813
VARIABLE PITCH PROPELLER
Filed March 9, 1936      3 Sheets-Sheet 1
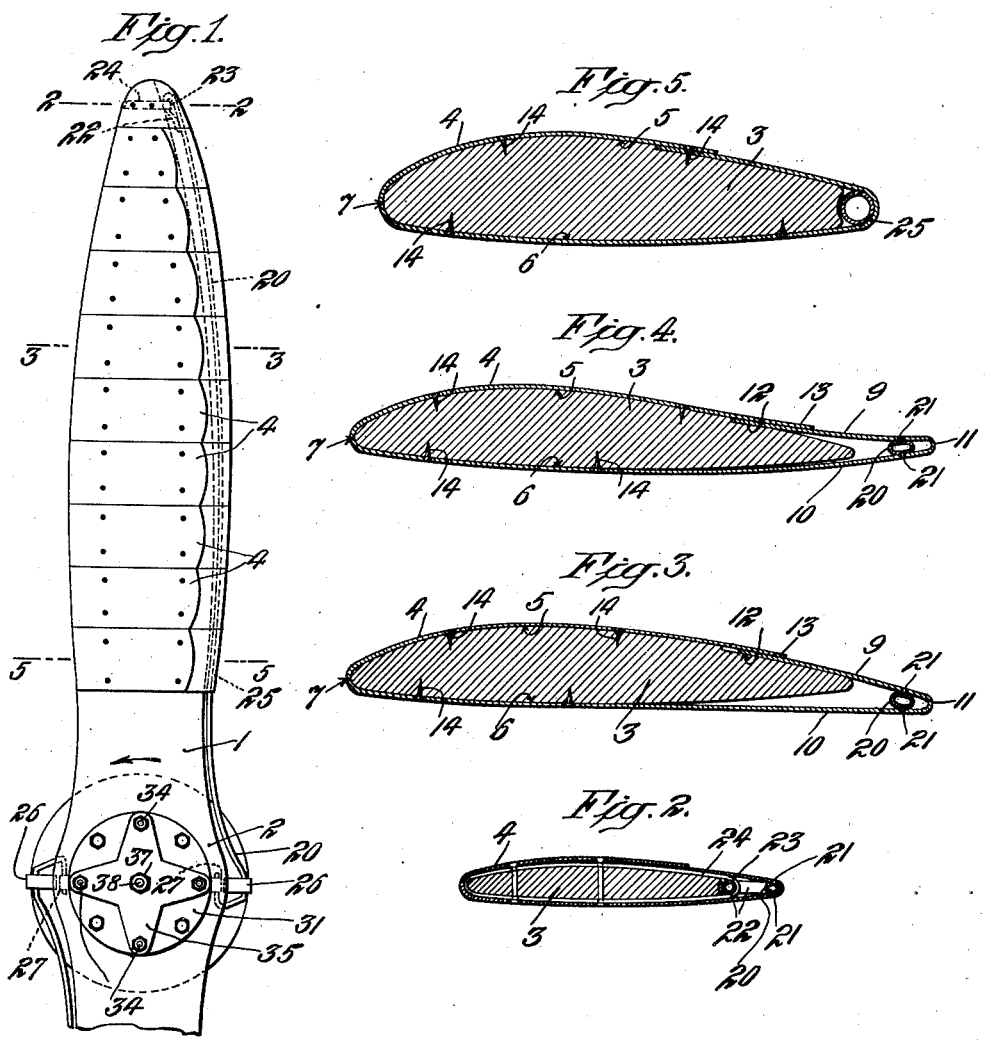
INVENTOR
LELAND E. REID
BY
Sager + Malcolm
his ATTORNEYS Aug. 16, 1938.          L. E. REID          2,126,813
VARIABLE PITCH PROPELLER
Filed March 9, 1936          3 Sheets-Sheet 2

INVENTOR
LELAND E. REID
BY
Sager + Malcolm
his ATTORNEYS

Aug. 16, 1938.  L. E. REID  2,126,813
VARIABLE PITCH PROPELLER
Filed March 9, 1936  3 Sheets—Sheet 3
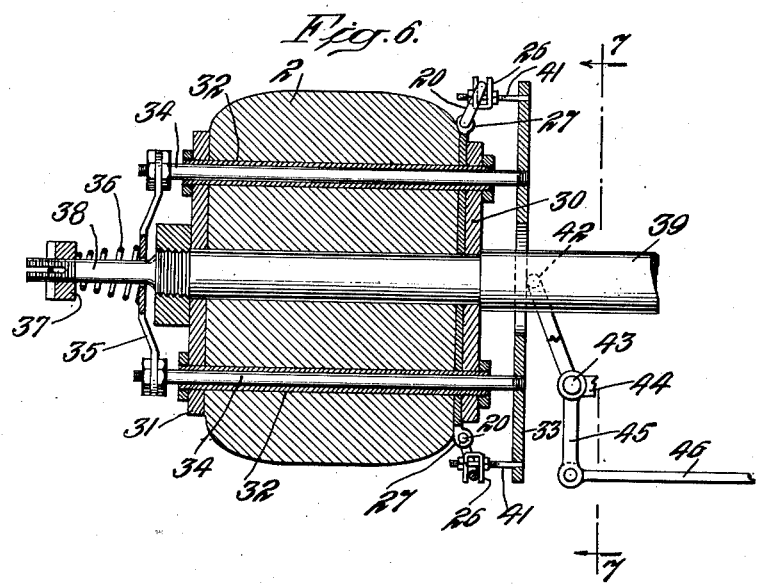
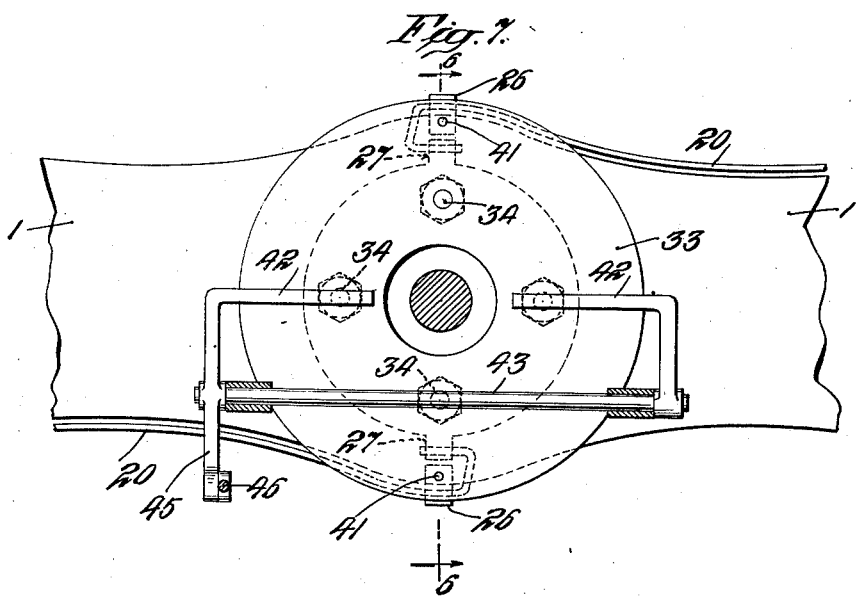
INVENTOR
LELAND E. REID
BY
Sager + Malcolm
his ATTORNEYS Patented Aug. 16, 1938

2,126,813

UNITED STATES PATENT OFFICE 2,126,813

VARIABLE PITCH PROPELLER

Leland E. Reid, South Pasadena, Calif., assignor to Mildred M. Reid, South Pasadena, Calif.

Application March 9, 1936, Serial No. 67,772

15 Claims. (Cl. 170—161)

This invention relates to variable pitch propellers for aircraft and has for its object to provide an improved propeller having both manual and automatic means for adjusting the pitch or angle of attack in accordance with operating requirements.

A feature of the invention resides in the provision of a propeller having a rigid fixed blade with a flexible airfoil surface at the trailing edge thereof. In one embodiment the flexible airfoil surface comprises a metal sheathing extending beyond the trailing edge of the rigid blade with a control rod extending along the sheathing to control the flexure thereof. Manual means are provided for actuating the control rod from the cockpit of the plane. Means are also provided whereby the sheathing automatically flexes in response to variations in air pressure encountered under different operating conditions so as to automatically adjust the effective pitch of the blade.

Although the novel features which are believed to be characteristic of this invention will be particularly pointed out in the claims appended hereto, the invention itself as to its objects and advantages and the manner of its operation will be better understood by referring to the following description taken in connection with the accompanying drawings in which certain preferred embodiments of the invention are set forth for purposes of illustration.

In the drawings, Fig. 1 is a plan view of a propeller constructed in accordance with the invention;

Fig. 2 is a transverse section taken on line 2—2 of Fig. 1;

Fig. 3 is a transverse section taken on line 3—3 of Fig. 1;

Fig. 4 is a transverse section similar to Fig. 3 but showing the airfoil surface in a different flexed position;

Fig. 5 is a transverse section taken on line 5—5 of Fig. 1;

Fig. 6 is a longitudinal section taken through the hub of the propeller along the line 6—6 of Fig. 7;

Fig. 7 is a transverse section taken along the line 7—7 of Fig. 6;

Figure 8:
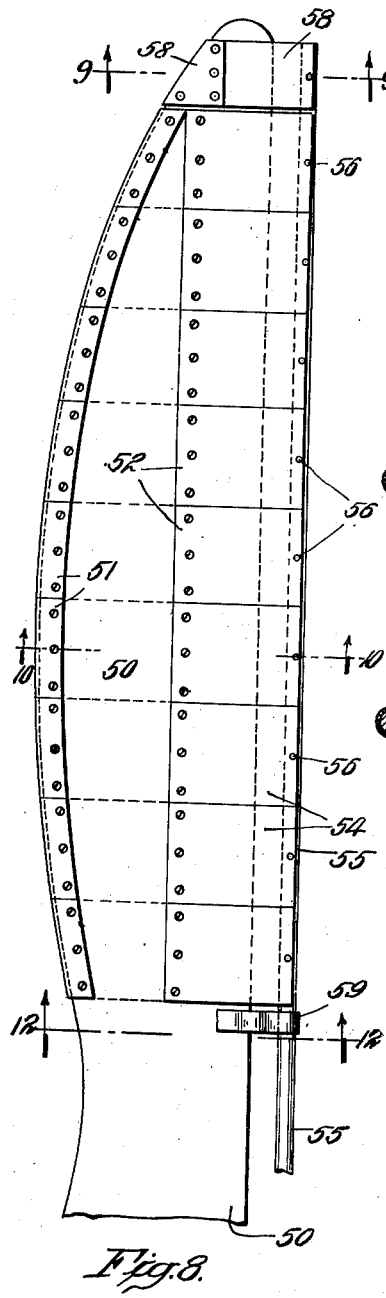
Fig. 8 is a plan view of a different type of propeller blade.

In the following description and in the claims certain specific terms are used for convenience in referring to various details of the invention. It is to be understood, however, that these terms are to be given as broad an interpretation as the state of the art will permit.

Referring to the drawings more in detail, the invention is shown in Figs. 1 to 5 as applied to a propeller comprising a blade 1, formed integrally with or attached to a hub 2. The blade 1 is shown as of the symmetrical type in which both the leading edge and the trailing edge are similarly curved about the longitudinal axis. The blade comprises a core 3 which may be made of any rigid material such as wood or metal and is of the proper sectional shape to provide the desired propeller characteristics. A sheathing 4, preferably formed of light flexible metal, and made in a plurality of strips as indicated in Fig. 1, may be secured to the upper surface 5 and lower surface 6 of the core 3, lying closely over leading edge 7 of the core and extending beyond the trailing edge 8 to provide upper and lower flexible airfoil surfaces 9 and 10, respectively, and to form the trailing edge 11 of the blade. The free edge 12 of the flexible airfoil surface 9 is positioned beneath the rear edge 13 of the fixed portion of the sheathing 4 and is free to slide transversely of the blade as the trailing edge is flexed in a manner hereinafter described. It will be noted that the sheathing is secured by screws 14 to the forward part of the core 3 but is left free at the trailing part of the core so as to provide the necessary flexibility. The trailing part of the upper and lower surfaces of the core 3 is shaped to limit the movement of the flexible airfoil surfaces 9 and 10 and to control the contour thereof.

In order to manually control the position of the flexible airfoil surfaces a control rod 20 is provided which extends within the trailing edge of the sheathing along the entire blade. The control rod 20 is rigidly secured to the upper and lower flexible airfoil surfaces 9 and 10 as by pins 21 or by spot welding and at the tip of the rod is bent back to form a loop 22 which is journaled in a bearing 23 formed by a strap 24 which extends around the core 3. The rod 20 is also journaled in a bearing 25 formed by a section of the sheathing 4 at a point near the hub 2, as indicated in Fig. 5, the arrangement being such that the control rod 20 may be rotated or twisted a limited amount about the axis of the two bearings above mentioned. The control rod 20 follows the general contour of the trailing edge of the propeller and consequently is bent or bowed outwardly between the two bearings 23 and 25 to provide the greatest effective leverage at the center of the blade which tapers off toward the tip and toward the hub, the leverage being zero at the two bearings above mentioned.

The control rod 20 is extended beyond the bearing 25 and follows the general contour of the trailing edge of the propeller blade to the hub 2 of the propeller, being bent outwardly and passing through a yoke 26 hereinafter described and thence being bent inwardly and held in a bearing 27 formed in a plate 28 (Fig. 6) which is secured to the hub 2. The hub 2 is provided with front and rear plates 30 and 31, respectively, which are secured on opposite sides of the hub by means of hollow bolts 32. A ring 33 is carried by rods 34 which extend through the hollow bolts 32 and are joined at their rear ends to a bracket 35. A spring 36 seated between the bracket 35 and a shoulder 37 formed on a rod 38 holds the ring 33 away from the hub 2. The rod 38 may form a part of or be secured to the drive shaft 39 which extends through the hub 2 and by which the propeller is driven. The yoke 26 is carried by a pin 41 which is attached to the ring 33 and by its position controls the rotation or twisting motion of said control rod. The position of the ring 33 is controlled by a pair of fingers 42 secured to a shaft 43 which is pivoted to a fixed frame as at 44 and is actuated by a lever 45 connected by a link 46 to a manual control device (not shown) in the cockpit of the plane.

The control rod 20 serves to stiffen the trailing edge of the flexible sheathing and thereby contributes to the automatic flexing of the flexible airfoil surfaces as well as to the manual control thereof. Assuming, for example, that the propeller is rotated under conditions of maximum resistance, that is, with the plane stationary, the air pressure upon the flexible airfoil surfaces tends to flex the same from the position of maximum pitch shown in Fig. 3 to a position of minimum pitch such as that shown in Fig. 4, thereby decreasing the angle of attack of the propeller. As the air resistance decreases, due, for example, to an increase in the speed of the plane, a decrease in density of the air, or a decrease in the speed of the propeller, the resilience imparted by the control member 20 and the centrifugal force acting upon the airfoil surfaces and upon the control member serve to progressively return the airfoil surfaces to their position of maximum pitch. In this way the pitch angle of the blade is automatically adjusted in accordance with the air pressure built up by the propeller and may be maintained at the optimum value for efficient operation under the various conditions of flight.

The pitch is further adjusted manually by means of the link 46 shown in Figs. 6 and 7, which may be actuated by suitable control mechanism in the cockpit of the plane. When this link 46 is actuated to cause the fingers 42 to press against the ring 33, the ring is moved transversely against the tension of the spring 36, thereby moving the yoke 26 and causing the rod 20 to turn about the bearings 27, 25 and 23 described above. This turning movement of the rod 20 serves to flex the airfoil surfaces 9 and 10 as illustrated in Fig. 4. The pitch of the propeller can accordingly be adjusted in flight manually as well as automatically.

It is to be noted that the curvature of the rod 20 between the bearings 23 and 25 is such that the maximum flexure of the airfoil surfaces takes place at about the center of the blade. It is obvious that the rod 20 and the trailing edge of the airfoil surfaces may be so shaped that the maximum flexure may be obtained at any desired point and any desired relationship may be maintained between the flexures at the various parts of the airfoil surfaces. The lower airfoil surface 10 bends about the lower surface 6 of the core 3, whereas the upper airfoil surface 9 slides under the edge 13 of the sheathing 4. The sheathing accordingly serves to anchor the upper airfoil surface in position and to maintain the desired contour at the top of the blade.

Figure 9:
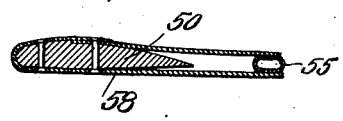
Fig. 9 is a transverse section taken on line 9—9 of Fig. 8.
Figure 10:
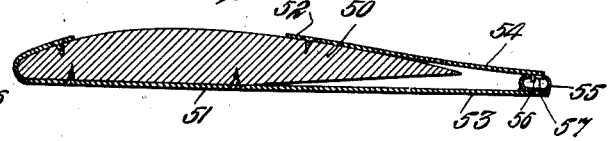
Fig. 10 is a transverse section taken on line 10—10 of Fig. 8.
Figure 11:
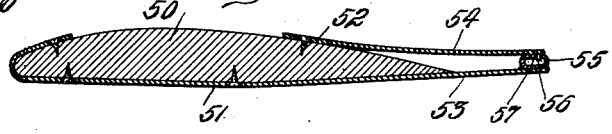
Fig. 11 is a similar transverse section showing the airfoil surface in a different flexed position.
Figure 12:
Fig. 12 is a transverse section taken on line 12—12 of Fig. 8.

The invention as described above applies to the symmetrical type of propeller blade. It may also be applied to the various other types of blades, such as the sweepback blade shown in Figs. 8 to 12. In this type of blade the trailing edge is substantially straight, whereas the leading edge is shaped to produce the best operating characteristics. Referring more particularly to Figs. 8 to 12, the blade is shown as comprising a rigid core 50 having a lower sheathing 51 and an upper sheathing 52 secured thereto. The upper sheathing 52 is shown as covering only a portion of the top surface of the core 50 and the lower sheathing as extending around the leading edge of the core. The extent of the two sheathings may, however, be varied as desired. Both the upper and lower sheathings 51 and 52 are free at the trailing portion of the core and extend beyond the core to form flexible airfoil surfaces 53 and 54 similar to the airfoil surfaces 9 and 10 described above. A control rod 55 may be rigidly secured, as by pins or spot welding, to the top of the sheathing 51 at the rear portion thereof in a position such that the rear of the control rod forms the trailing edge of the blade. The sheathing 52 may be loosely secured as by pins 56 and slots 57 to the rod 55 so as to be free to slide over the surface of said rod as the airfoil surfaces are flexed, or it may be held in position by the resilience of the metal itself.

The end of the rod 55 at the blade tip may be secured to a hinge 58, formed of the sheathing itself, which extends around and is secured to the core 50. The hinge 58 is adapted to flex in response to rotation or twisting movement of the rod 55. The rod 55 may also be attached to a hinge 59 which may grip the propeller blade at a point near the hub thereof, the arrangement being such that the hinges 58 and 59 control the transverse movement of the rod 55 and, consequently, the flexure of the airfoil surfaces 53 and 54, as the control rod is rotated or twisted. It is to be understood that the control rod may be connected to suitable control linkages, such as the ring 33 illustrated in Figs. 6 and 7, so as to provide the necessary manual control.

The operation of this embodiment of the invention is similar to that described above with the exception that the control rod 55 being straight, the entire trailing edge of the blade is flexed substantially equally. It is obvious, however, that the shape of the control rod and of the trailing edge of the blade may be varied as desired and that a particular form has been disclosed for purposes of illustration only. It is also evident that the manual control may be operatively connected to the control rod in any desired manner. A specific form of mechanical linkage has been set forth merely for purposes of illustration.

While certain specific embodiments of the invention have been described in detail, it is to be understood that the invention is not to be limited thereto but that various changes and modifications may be made therein as will be apparent to a person skilled in the art. Hence the invention is to be limited only in accordance with the following claims when interpreted in view of the prior art.

The invention claimed is:

1. In a propeller, a hub, a blade secured thereto, said blade comprising a rigid core member having upper and lower surfaces, upper and lower flexible sheathings forming a continuation of said surfaces and extending beyond the trailing edge of said core member to form flexible airfoil surfaces, one sheathing being secured to said core member, the other sheathing being rigidly attached to said first sheathing and being in sliding engagement with said core member whereby it is free to move over the surface of said member in response to flexure of said airfoil surfaces.

2. In a propeller, a hub, a blade secured thereto, said blade comprising a rigid core member and a flexible sheathing extending beyond the trailing edge of said core member to form flexible airfoil surfaces, said sheathing being flexible transversely in a gradual arc to vary the pitch of the blade, a control rod extending along the trailing edge of said sheathing and secured thereto, means pivoting said control rod to said core member and means for turning said control rod about said pivot to control the flexure of said surfaces.

3. In a propeller, a hub, a blade secured thereto, said blade comprising a rigid core member having upper and lower surfaces, upper and lower flexible sheathings forming a continuation of said surfaces and extending beyond the trailing edge of said core member to form flexible airfoil surfaces, one sheathing being secured to said core member, the other sheathing being rigidly attached to said first sheathing and in sliding engagement with said core member whereby it is free to move over the surface of said member in response to flexure of said airfoil surfaces, and a control rod extending along said blade between said airfoil surfaces, said rod being rigidly secured to said sheathing whereby rotation of said rod causes flexure of said airfoil surfaces.

4. In a propeller, a hub, a blade secured thereto, said blade comprising a rigid core member and a flexible sheathing extending beyond the trailing edge of said core member to form flexible airfoil surfaces, said sheathing being flexible transversely in a gradual arc to vary the pitch of the blade, a control rod extending along the trailing edge of said sheathing and secured thereto, means pivoting said control rod to said core member and means for turning said control rod about said pivot to control the flexure of said surfaces, said last means comprising a lever formed on said control rod, a ring rotating with the propeller and adapted to actuate said lever, and means to manually control the position of said ring while in flight.

5. In a propeller, a hub, a blade secured thereto, said blade comprising a rigid core member and a flexible sheathing extending beyond the trailing edge of said core member to form flexible airfoil surfaces, a control rod extending along said sheathing and secured thereto, means pivotally connecting said rod to said core member at the tip of said blade and at a point near the hub, said rod following the general contour of the trailing edge of said blade and being bent outwardly between said pivot points whereby a maximum leverage is obtained at an intermediate point in said blade which leverage decreases as the pivot points are approached.

6. In a propeller, a hub, a blade secured thereto, said blade comprising a rigid core member having upper and lower surfaces, upper and lower flexible sheathings forming a continuation of said surfaces and extending beyond the trailing edge of said core member to form flexible airfoil surfaces, a control rod extending along said blade between said airfoil surfaces, said control rod being secured to one of said sheathings, the other sheathing being free to slide across said rod as said airfoil surfaces are flexed.

7. In a propeller, a hub, a blade secured thereto, said blade comprising a rigid core member and a flexible sheathing extending beyond the trailing edge of said core member to form flexible airfoil surfaces, said sheathing being flexible transversely in a gradual arc to vary the pitch of the blade, a control rod extending along the trailing edge of said sheathing and secured thereto, the end of said control rod being bent to form an arm, the free end of said arm being pivotally attached to said core member near the tip of said blade, the control rod being also pivotally attached to said core member near said hub, and being shaped to provide varying leverages along the blade whereby the different portions of the airfoil surfaces are differently flexed, and means for turning said control rod about said pivots so as to cause transverse movement thereof for flexing said surfaces in accordance with said leverage.

8. An aircraft propeller blade comprising a rigid blade body having a sectional shape to form upper and lower airfoil surfaces, upper and lower flexible sheathings carried by said body and forming a continuation of said surfaces and extending beyond the trailing edge of said rigid blade body to form trailing airfoil surfaces, said trailing airfoil surfaces being flexible transversely in a gradual arc to vary the effective pitch of the blade, and a rigid member extending longitudinally along the trailing edge of said sheathing to cause the entire flexible trailing part to flex as a unit.

9. An aircraft propeller blade comprising a rigid blade body having a sectional shape to form upper and lower airfoil surfaces, upper and lower flexible sheathings carried by said body and forming a continuation of said surfaces and extending beyond the trailing edge of said rigid blade body to form trailing airfoil surfaces, said trailing airfoil surfaces being flexible transversely in a gradual arc to vary the effective pitch of the blade, a rigid member extending longitudinally along the trailing edge of said sheathing to cause the entire flexing trailing part to flex as a unit, and means responsive to forces produced by the operation of the blade for causing flexure of said trailing part so as to maintain efficient operating conditions.

10. An aircraft propeller blade comprising a rigid blade body having a sectional shape to form upper and lower airfoil surfaces, upper and lower flexible sheathings carried by said body and forming a continuation of said surfaces and extending beyond the trailing edge of said rigid blade body to form trailing airfoil surfaces, said trailing airfoil surfaces being flexible transversely in a gradual arc to vary the effective pitch of the blade, a rigid member extending longitudinally along the trailing edge of said sheathing to cause the entire flexible trailing part to flex as a unit, and means responsive to the air pressure built up by the operation of the blade for causing flexure of said trailing part so as to maintain efficient operating conditions.

11. An aircraft propeller blade comprising a rigid core member forming the leading part of said blade and having a sectional shape to form upper and lower airfoil surfaces, upper and lower flexible sheathings carried by said core member and forming a continuation of said surfaces and extending beyond the trailing edge of said core member to form trailing airfoil surfaces, said trailing airfoil surfaces being flexible transversely in a gradual arc to vary the effective pitch of the blade, and a rigid member extending longitudinally along the trailing edge of said sheathing to cause the entire flexible trailing part to flex as a unit.

12. An aircraft propeller blade comprising a rigid core member forming the leading part of said blade and having a sectional shape to form upper and lower airfoil surfaces, upper and lower flexible sheathings carried by said core member and forming a continuation of said surfaces and extending beyond the trailing edge of said core member to form trailing airfoil surfaces, said trailing airfoil surfaces being flexible transversely in a gradual arc to vary the effective pitch of the blade, a rigid member extending longitudinally along the trailing edge of said sheathing to cause the entire flexible trailing part to flex as a unit, and means normally holding said flexible trailing part in the position of maximum pitch when the propeller is at rest.

13. An aircraft propeller blade comprising a rigid core member forming the leading part of said blade and having a sectional shape to form upper and lower airfoil surfaces, upper and lower flexible sheathings carried by said core member and forming a continuation of said surfaces and extending beyond the trailing edge of said core member to form trailing airfoil surfaces, said trailing airfoil surfaces being flexible transversely in a gradual arc to vary the effective pitch of the blade, a rigid member extending longitudinally along the trailing edge of said sheathing to cause the entire flexible trailing part to flex as a unit, means normally holding said flexible trailing part in the position of maximum pitch when the propeller is at rest, and means responsive to air pressure built up by the operation of said blade for causing flexure of said trailing surfaces adapted to reduce said pitch.

14. An aircraft propeller blade comprising a rigid core member forming the leading part of said blade and having a sectional shape to form upper and lower airfoil surfaces, upper and lower flexible sheathings carried by said core member and forming a continuation of said surfaces and extending beyond the trailing edge of said core member to form trailing airfoil surfaces, said trailing airfoil surfaces being flexible transversely in a gradual arc to vary the effective pitch of the blade, a rigid member extending longitudinally along the trailing edge of said sheathing to cause the entire flexible trailing part to flex as a unit, means normally holding said flexible trailing part in the position of maximum pitch, and manual means for actuating said member so as to flex said trailing part in flight for thereby varying the effective pitch of said blade.

15. A propeller comprising a hub, a blade having a rigid core member secured to said hub, said core member having upper and lower rigid airfoil surfaces, upper and lower flexible sheathings carried by said core member and forming a continuation of said surfaces and extending beyond the trailing edge of said core member to form trailing airfoil surfaces, said trailing airfoil surfaces being flexible transversely in a gradual arc to vary the pitch of the blade, said core being shaped to engage and limit the movement of the flexible airfoil surfaces and to control the contour thereof when in maximum and minimum pitched positions.

LELAND E. REID.